No. 814,447. PATENTED MAR. 6, 1906.
J. B. HAWLEY.
CUTTING TOOL.
APPLICATION FILED JUNE 6, 1905.
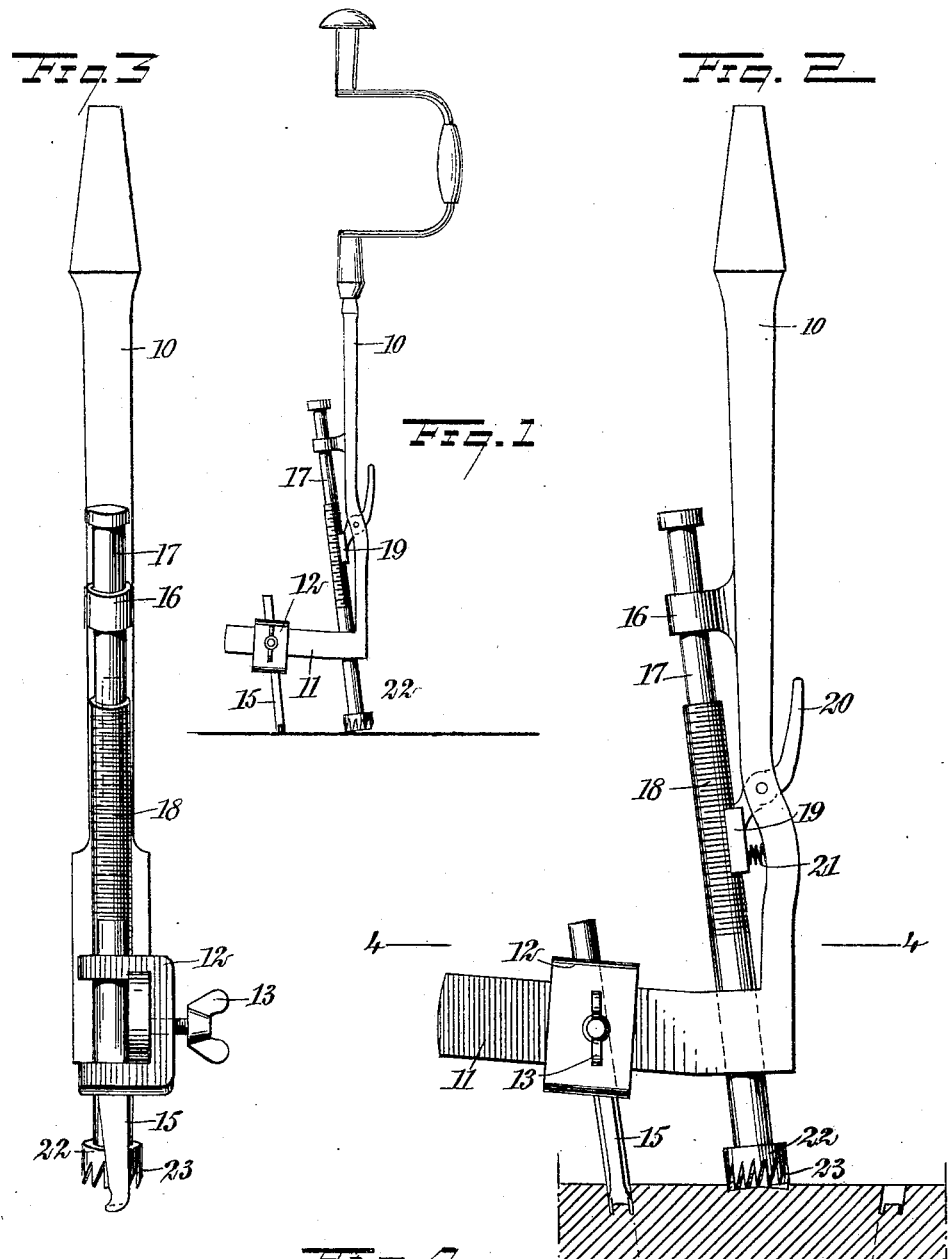
WITNESSES:
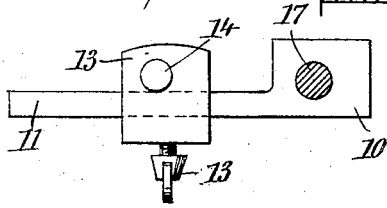
INVENTOR
John B. Hawley
BY
ATTORNEYS

UNITED STATES PATENT OFFICE.

JOHN B. HAWLEY, OF WALTON, NEW YORK.

CUTTING-TOOL.

No. 814,447.

Specification of Letters Patent.

Patented March 6, 1906.

Application filed June 6, 1905. Serial No. 263,945.

*To all whom it may concern:*

Be it known that I, JOHN B. HAWLEY, a citizen of the United States, and a resident of Walton, in the county of Delaware and State of New York, have invented a new and Improved Cutting-Tool, of which the following is a full, clear, and exact description.

My invention relates to a device which is especially designed for cutting conical surfaces, although by simplifying the parts it could be made to cut cylindrical surfaces.

The principal object of the invention is to provide means for cutting plugs to be used upon barrels and the like; but it is not limited to the manufacture of this particular product.

The invention comprises means for holding a cutting-tool in such a manner that it will be directed upon a line inclined with respect to the axis upon which the tool turns and with means for feeding the tool upon such a line; said means being readily controllable by the operator.

Further objects of the invention will appear below.

Reference is to be had to the accompanying drawings, forming a part of this specification, in which similar characters of reference indicate corresponding parts in all the figures.

Figure 1 is a side elevation of a cutting implement constructed in accordance with my invention. Fig. 2 is a similar view on an enlarged scale. Fig. 3 is a side elevation, and Fig. 4 is a sectional view on the line 4 4 of Fig. 2.

The device is intended to be used with a handle or stock, preferably in the manner in which an ordinary boring-tool is employed. In order to fit the handle or stock, the tool is provided with a shank 10. On the lower end of this shank is located a projection 11, which preferably has parallel surfaces, so as to act as a guide for a tool-holder 12. This tool-holder is preferably in the form of a yoke and has a thumb-screw or similar device 13 for securing it to the projection 11 at any desired distance from the shank or from the center upon which the tool turns. This yoke is also provided with preforations 14, through which a cutting-tool 15 is adapted to pass.

It will be understood that after the yoke is placed in the desired position and the cutting-tool placed in the perforations the screw 13 is tightened, so as to hold the parts in this position. The upper and lower portions of the yoke, which engage the bottom and top of the projection 11, are not exactly in vertical alinement, or at least the perforations through them are placed out of vertical alinement, so as to tilt the tool on a line in such a direction as to provide for cutting a conical surface.

The body of the tool is provided with a perforation at the lower portion thereof on a line substantially parallel with the line upon which the cutting-tool is located. At a point well up on the shank a projection 16 is provided, and this has a perforation in alinement with the lower perforation, and through both of these passes a centering device 17. This centering device is provided with smooth portions for passing through the two perforations and with a screw-threaded portion 18 for providing the feed. Engaging the screw-threaded portion is a jaw 19, pivoted to the shank and having a handle 20, by means of which it may be moved out of engagement with the screw-thread. A spring 21 is provided for normally holding the jaw in engagement with the screw-thread. At the lower end of the centering device or bar 17 is a head 22, which is provided with sharpened teeth 23 for engaging the work and centering the tool.

In operation the teeth 23 are placed in the work, so that they will not turn with the tool when a handle is applied to it and it is rotated in the usual manner. As the central line of the shank, which passes through the center of the plane upon which the points of the teeth 23 are located, is vertical and the central line of the bar 17 is inclined, it will be obvious that the rotation of the shank causes the bar 17 to turn or wabble about the central line of the shank, although the teeth 23 are not permitted to rotate. The shank 10 also rotates about the centering device 17, and the jaw 19 moves about the threads 18, and consequently feeds the shank and tool downwardly. By this double rotation the lower perforation in the shank approaches the stationary teeth 23 and the real center moves toward this perforation. During the entire period of rotation the projection 11 is kept substantially in the same plane, and consequently the cutting-tool 15 is forced to cut an annular recess in the work, which gradually contracts toward the bottom, so that the article cut from the work will be in the form of a cone.

While I have illustrated the device as applicable to the manufacture of plugs and other cones, it will be readily understood that the feeding device and other features can be employed upon a tool designed for cutting cylinders or other shaped bodies without departing from the spirit of my invention. By putting the bar or centering device 17 on a line parallel with the shank and with the direction of motion of the tool, cylinders can be cut and the feed provided for in the manner described.

Having thus described my invention, I claim as new and desire to secure by Letters Patent—

1. A cutter having a shank, a centering device mounted on an inclined axis with respect to the axis of the shank, means on the shank for holding a cutting-tool, and means for feeding the tool in a line parallel with the centering device.

2. A cutter having a shank by which it is adapted to be rotated, a centering device mounted on an inclined axis with respect to the axis of the shank, the axis of the centering device crossing the axis of the shank at a point beyond the end of the shank, means on the shank for holding a cutting-tool, and means for feeding the tool in a line parallel with the centering device.

3. A cutter having a shank for engaging a stock or handle, a centering device inclined with respect to said shank, a tool rigidly mounted with respect to the shank, and means for feeding the tool along the centering device in a line parallel therewith.

4. An implement of the class described, comprising a shank, a bar slidably mounted thereon at an angle thereto, a projection upon the shank, and means on the projection for mounting a tool in a position parallel with said bar.

5. An implement comprising a shank, a bar at an angle to the shank slidably and rotatably mounted with respect thereto, said bar having means for engaging work and centering the implement, and means for supporting a tool rigidly with respect to the shank and on a line parallel with said bar.

6. An implement comprising a shank, a bar at an angle to the shank slidably and rotatably mounted with respect thereto, said bar having means for engaging work and centering the implement, means for supporting a tool rigidly with respect to the shank and on a line parallel with said bar, and means for feeding said bar in an upward direction as the implement is rotated.

7. An implement comprising a vertical shank, an inclined bar slidably and rotatably mounted with respect thereto, said bar having means for engaging work and centering the implement, means for supporting a tool rigidly with respect to the shank and on a line parallel with said bar, and means for feeding said bar in an upward direction as the implement is rotated; said means comprising screw-threads upon the bar, and a jaw connected with the shank and adapted to engage said screw-threads.

8. An implement comprising a shank, means for mounting a cutting-tool thereon, a bar slidably mounted upon the shank in an inclined position, means for preventing said bar from turning upon its own axis as the implement is rotated, said bar being provided with screw-threads, and a lever mounted on the shank and having a jaw provided with teeth for engaging said screw-threads.

9. An implement comprising a shank, means for mounting a cutting-tool thereon, a bar mounted on the shank in an inclined position, and means for feeding the bar along the shank when the implement is rotated.

10. An implement comprising a shank, means for mounting a cutting-tool thereon, a bar slidably mounted upon the shank in an inclined position, said bar being provided with screw-threads, and a lever mounted on the shank and having a jaw provided with teeth for engaging said screw-threads.

In testimony whereof I have signed my name to this specification in the presence of two subscribing witnesses.

JOHN B. HAWLEY.

Witnesses:
 Wm. G. Moore,
 Roderick Fitch.